Nov. 11, 1924.  
J. T. DAVIS  
COTTON CHOPPER  
Filed Feb. 9, 1924  
1,515,012  
4 Sheets-Sheet 4
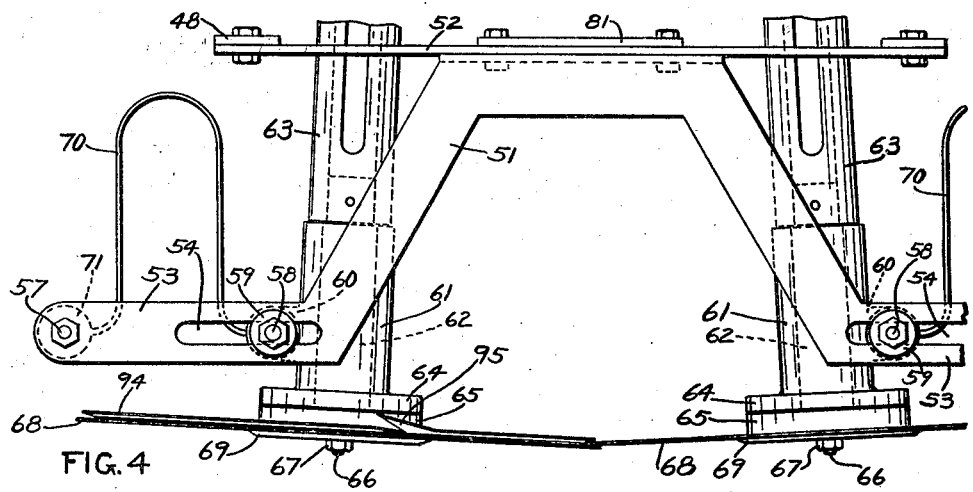
FIG. 4
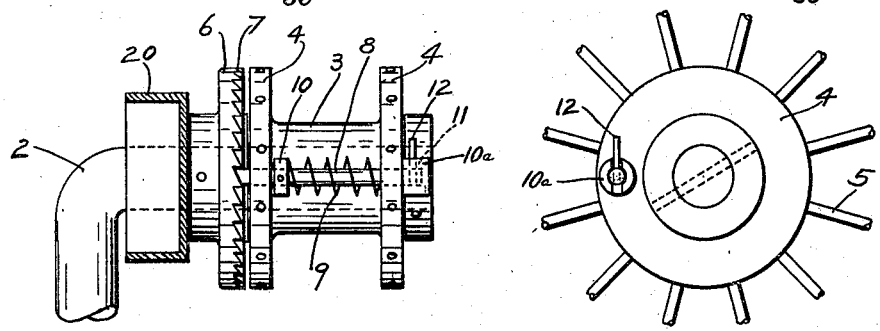
FIG. 5
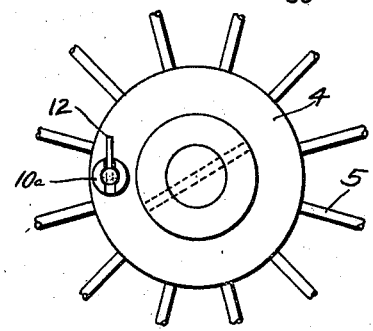
FIG. 6
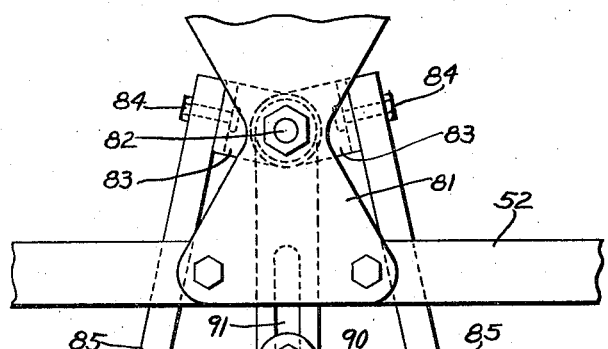
FIG. 7
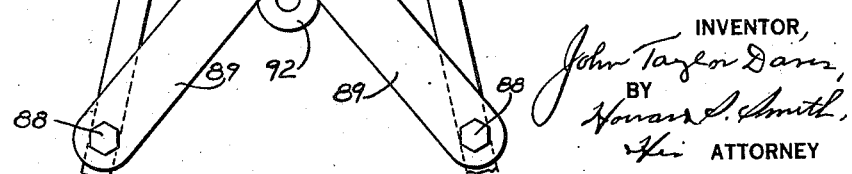
INVENTOR,  
John Taylor Davis,  
BY  
Howard S. Smith,  
ATTORNEY Patented Nov. 11, 1924.

1,515,012

UNITED STATES PATENT OFFICE.

JOHN TAYLOR DAVIS, OF DAYTON, OHIO.

COTTON CHOPPER.

Application filed February 9, 1924. Serial No. 691,762.

*To all whom it may concern:*

Be it known that I, JOHN TAYLOR DAVIS, a citizen of the United States, residing at Dayton, in the county of Montgomery and State of Ohio, have invented certain new and useful Improvements in Cotton Choppers, of which the following is a specification.

It is the principal object of my invention to provide a simple, economical and efficient device for thinning or chopping cotton plants in a row, so that plants may be left standing at regularly spaced intervals and all others may be cut off between them.

Another object of my invention is to provide a device for breaking up and throwing the soil away from a row of cotton plants in advance of the cutters and then throwing a ridge of soil against the plants left standing.

A further object of my invention is to provide a cotton chopping device having a universal movement to insure uniform operation in ground of irregular surface and between unequally spaced rows.

Other important and incidental objects will be brought out in the following specification and particularly set forth in the subjoined claims.

Figure 1:
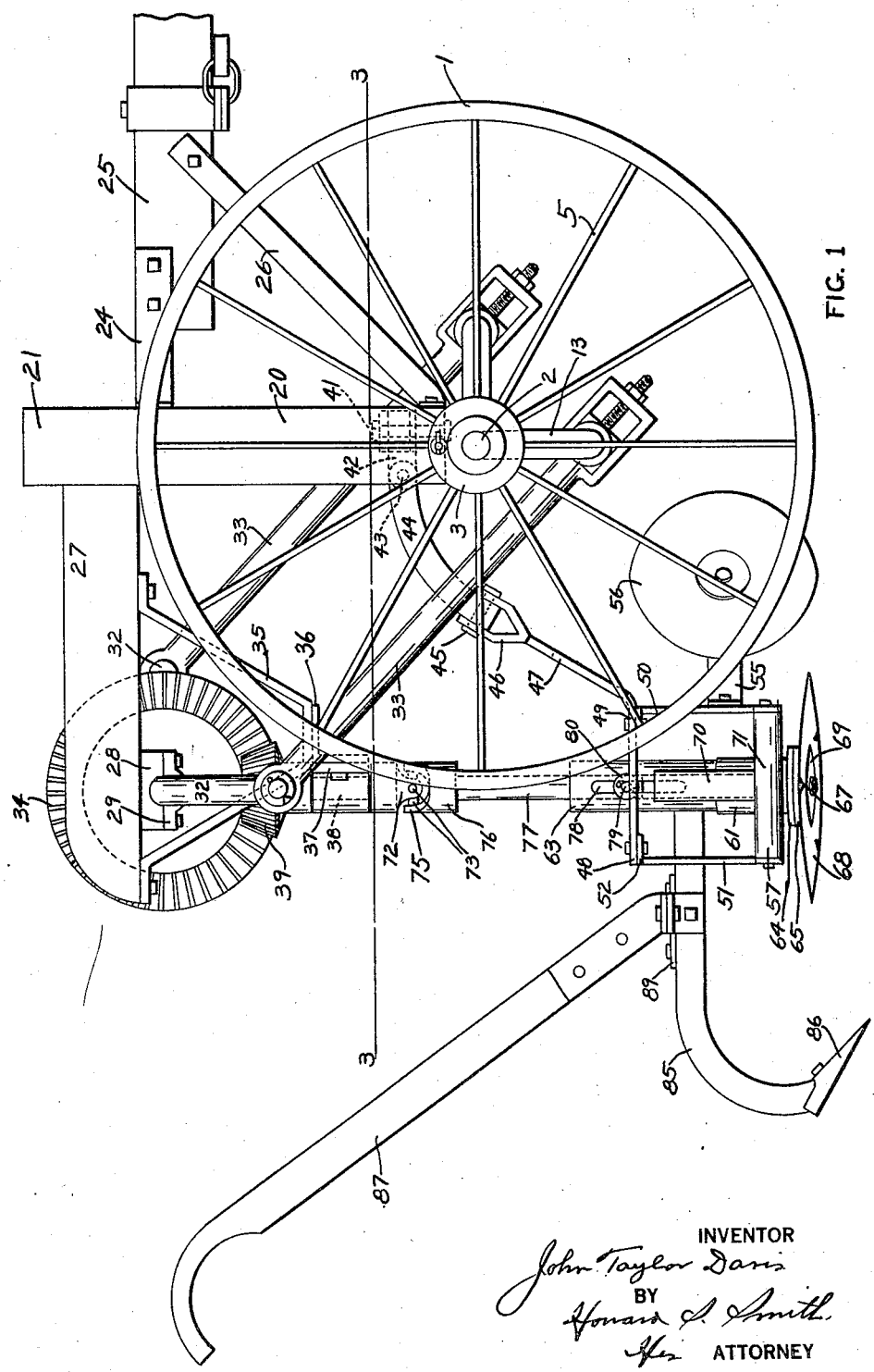
Figure 2:
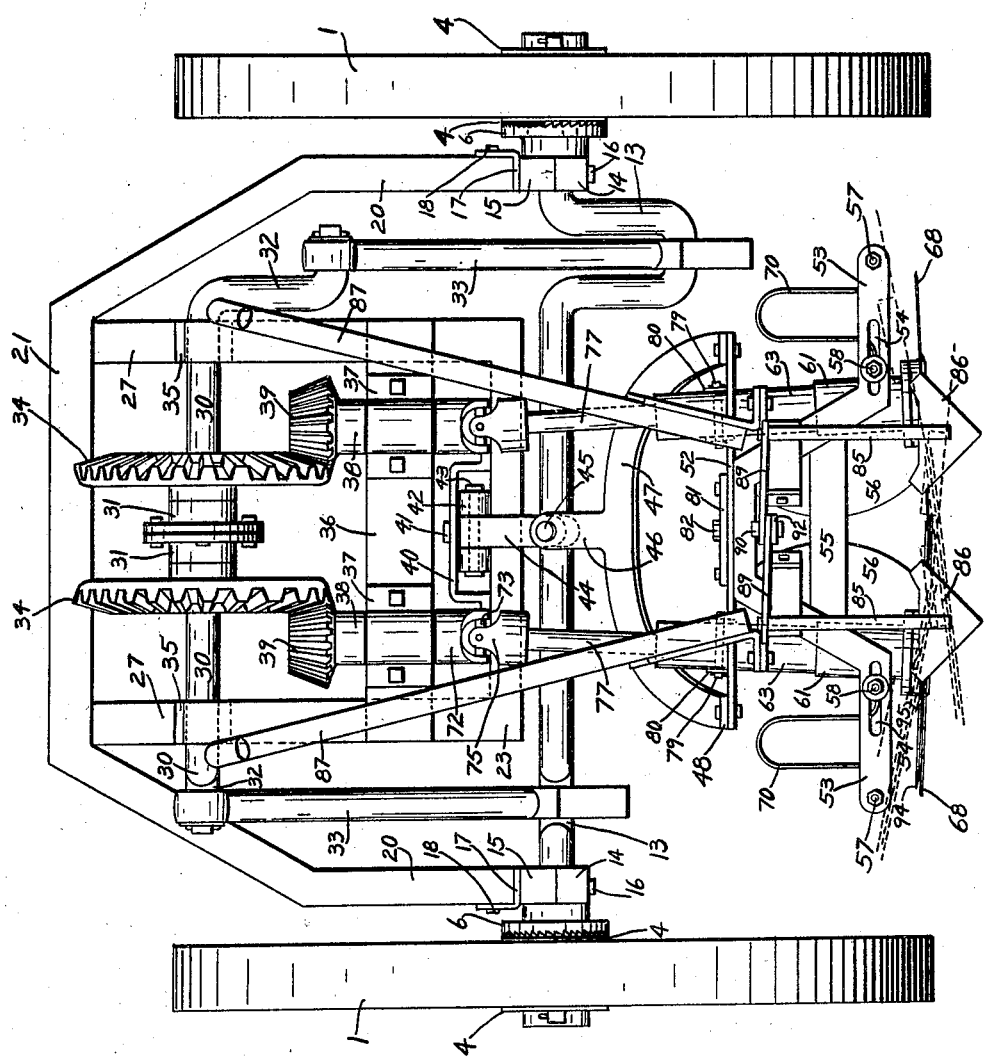
Figure 3:
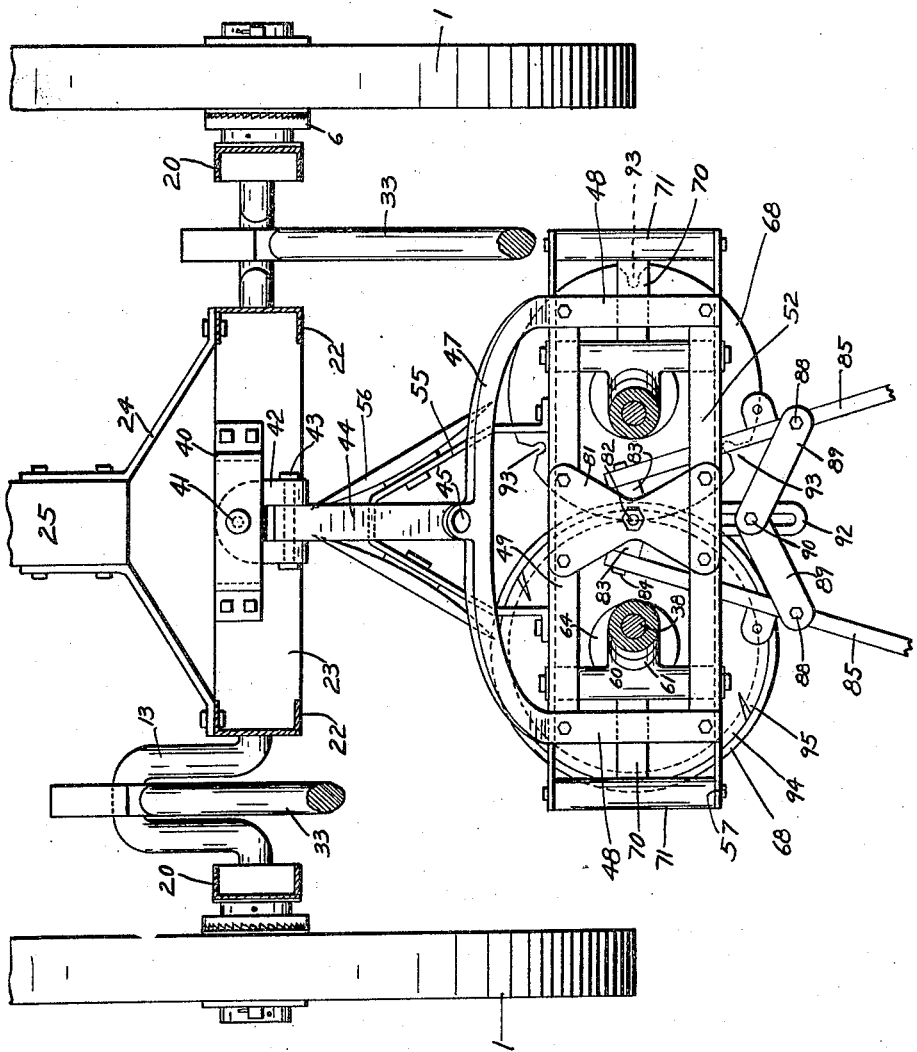

In the accompanying drawings, Figure 1 is a side elevational view of my improved cotton chopping device. Figure 2 is a rear elevational view showing the cotton chopping cutters and cultivators in their normal positions, the dotted lines illustrating the position the cutters would assume when the device is operated on sloping ground. Figure 3 is a sectional plan view on the line 3—3 of Figure 1. Figure 4 is a sectional rear view of the chopping discs and tensioning mechanism. Figure 5 is a plan view of the hub of one of the ground wheels, showing the ratchet means therefor. Figure 6 is an end view of said hub and ratchet means. And Figure 7 is a plan view showing the means for adjusting the plow shovels.

Throughout the specification and drawings, similar reference characters denote corresponding parts.

Referring to the accompanying drawings for a detailed description of my invention, the numerals 1, 1 designate the ground wheels of a cotton chopper that rotate upon the opposite ends of an axle 2 to turn the latter through the following means. Referring to Figures 1, 2, 5 and 6, the numeral 3 designates the hub of each ground wheel 1, which hub has two annular flanges 4, 4 from which wire spokes 5 radially project to the wheel rim. Secured to the axle 2 adjacent the inner flange 4 of each wheel 1, is a disc 6 having ratchet teeth 7 formed on its outer face. Projecting through oppositely disposed holes in the flanges 4, 4 of the hub, is a rod 8 whose inner end is normally held in engagement with the teeth 7 of the disc 6 by a helical spring 9 that surrounds the rod between said flanges. At its inner end the spring 9, which is under compression, is secured to a collar 10 that is pinned to the rod 8. This rod, being free to move longitudinally, is forced into engagement with the ratchet teeth of the disc 6 by the compressed spring 9, since the outer end of the latter engages the fixed outer flange 4 on the hub 3 of the wheel. Therefore, when the wheels 1, 1 turn together, they will both rotate the axle 2, but when one of them rotates at a less rate than the other, as when the machine is making a turn, the axle will be rotated by the faster moving wheel and will turn freely in the hub of the slower moving one.

When the device is being drawn from one field to another, as on a roadway, the rod 8 may be withdrawn from engagement with the ratchet disc 6 and held in a non-engaging position with the latter by the following means. Secured to the outer face of the outer hub flange 4, or formed integral with the latter, is a cylindrical stop member $10^a$ through an axial hole in which the rod 8 freely projects. Formed in the outer part of the member 10 is a deep radial notch 11 which receives a pin 12 on the rod 8 to permit the inner end of the latter to be pressed into engagement with the ratchet disc 6 by the spring, but when it is desired to hold the rod out of engagement with the disc, the pin 12 on the rod is pulled out of the radial notch 11 and turned so that, by its engagement with the outer edge of the stop member $10^a$, or in a shallow notch in the latter, it will prevent the rod being pressed inwardly by the spring a sufficient distance to engage the ratchet disc, thereby permitting the ground wheels 1, 1 to rotate without turning the axle 2. (See Figures 5 and 6.)

Formed on the axle 2 between the ratchet discs 6, 6, are two U-shaped cranks 13, 13. Between each crank 13 and the adjacent ratchet disc 6, two journal boxes 14 and 15 that are connected together by bolts 16 or other suitable means, surround the axle 2. Secured to these journal boxes by means of angle pieces 17 and bolts 18, are the lower ends of an arched main-frame member 20 having a top horizontal portion 21. Depending from the latter are two vertical end members 22, 22, to the bottom parts of which there is secured a horizontal base member 23. The horizontal portion 21 of the member 20, the vertical end members 22, 22 and the horizontal base member 23, all of which are preferably constructed of iron, form together a rectangular supporting frame for the means to be hereinafter described for operating the chopper mechanism. (See Figure 2.)

Projecting forwardly and inwardly from the upper portions of the end members 22, 22, are two members 24, 24, one of which is shown in Figure 1, for attachment to the sides of a wood tongue 25 for use when the implement is animal drawn. Braces 26, one of which is shown in Figure 1, project upwardly and inwardly from the lower portions of the end members 22, 22 for attachment to said tongue 25.

Secured to, and projecting rearwardly from, the upper portions of the end members 22, 22, are two horizontal supporting members 27, 27. Secured to the bottom of the rear end portion of each horizontal member 27 are journal boxes 28 and 29 in each pair of which there is journaled the outer end of a crank shaft 30. Fast on the inner end of each shaft 30 is a flange coupling 31. The couplings 31, 31 are suitably secured together to connect at their inner ends the shafts 30, 30 that have formed on their outer ends crank portions 32, 32 respectively. The crank portion 32 of each shaft 30 is connected by a pitman 33 with the crank portion 13 of the axle 2 on its respective side of the implement. Thus, when the axle is rotated by the ground wheels 1, 1, it will turn the crank shafts 30, 30 to rotate two outwardly-facing bevel gears 34, 34, secured to the inner ends of said shafts. (See Figures 1 and 2.)

Bolted to the bottom portions of the horizontal members 27, 27 are U-shaped brackets 35, 35 to which there are secured the ends of a transverse angle-iron 36. Journaled in brackets 37, 37 secured to the angle-iron 36 diagonally below the gears 34, 34, are two vertical shafts 38, 38. Secured to the upper ends of the latter are small bevel gears 39, 39 which mesh with the gears 34, 34 respectively for rotation by them to operate the chopping mechanism now to be described.

Referring to Figures 1, 2 and 3 there is secured to the middle portion of the top of the horizontal main frame member 23, an arched coupling member 40 in which there is pivotally secured, by means of vertical pin 41, a clevis 42. Hingedly secured to the latter by means of a horizontal pin 43, is a downwardly curved connecting bar 44. Hingedly secured to the lower end of this bar by a pin 45, is the upper fork portion 46 of the downwardly inclined arch portion 47 of a rectangular horizontal frame 48.

Depending from the front horizontal portion 49 of the frame 48 is an arched member 50 similar to an arched member 51 which is secured to the horizontal portion 52 of the frame 48. These arched members 50 and 51 terminate in outwardly projecting horizontal foot portions 53 containing near their inner ends longitudinal slots 54, for a purpose to be hereinafter described. (See Figures 2 and 4.)

Projecting forwardly from the arched member 50 is a V-shaped frame 55 near the vertex of which two disc cutters 56, 56 are secured for a revolving movement through the ground with their cutting edges almost touching. These cutters, or cultivators, throw the soil away from the row of cotton plants in advance of the cotton choppers or cutters to be hereinafter described.

The outer ends of the foot portions 53 of the arched members 50 and 51 are connected by bolts 57 or other suitable elements. Slidable in the slots 54 toward and away from the bolts 57 are bolts 58 or other suitable elements on whose outer ends are flanges 59. (See Figures 2 and 4.)

Secured on each bolt 58 is the right-angled boss portion 60 of a vertical bearing member 61 for a shaft 62 to the upper end of which a sleeve 63 is pinned. Formed on the lower end of the bearing member 61 is a flange 64 below which a disc 65 of preferably the same diameter as the flange, is secured to the shaft 62. Projecting downwardly from the middle part of the disc 65 is a stub shaft 66 threaded at its lower end to receive a nut 67 for the purpose of holding on said shaft a cotton chopping or cutting disc 68. The latter is held tightly against the flange 65 by a washer 69 against which the nut 67 presses.

The bolts 58 to which the bearing members 61 are secured, are free to swing outwardly against the tension of M-shaped flat springs 70, 70. The outer, lower end of each spring 70 is secured to a hollow cylinder 71 mounted on one of the bolts 57, while its other end is secured to the boss portion 60 of its nearest bearing member 61. The construction thus described permits the chopping discs 68, 68 to yield or move away from each other when stones or other obstructions are encountered by them, or to permit them to be pulled apart for the removal of an entangled mass between them, after which the springs 70, 70 will return them to their normal positions.

The cotton chopping or cutting discs 68, 68 are rotated by the shafts 38, 38 respectively through the universal means now to be described. Referring to Figures 1 and 2, each shaft 38 has a lower forked end 72 in which two diametrically alined arms of a spider 73 are pivotally secured. The other two diametrically alined arms of the spider 73 are pivotally secured in the upper forked end 75 of the enlarged cylindrical head 76 of a plunger rod 77 in a respective sleeve 63. Formed in each sleeve 63 is a longitudinal slot 78 in which there is vertically movable a guiding pin 79 projecting at right angles from the lower end of the plunger rod 77 within the sleeve. Secured on the outer ends of the pin 79 are retaining flanges 80 of larger diameters than the slots through which the pins 79 project.

It will now be seen that when the shafts 38, 38 are rotated by the ground wheels 1, 1 through the mechanism hereinbefore described, they will turn the cotton chopper or cutter discs 68, 68 irrespective of their positions with reference to the plants. When the chopper frame is raised about the pin 43, the sleeves 63, 63 which rotate the cutters 68, 68, will ascend over their plunger rods 77, 77, since the pins 79 on the latter which drive the sleeves 63 are free to move through the longitudinal slots 78 in them. The universal connection between the shafts 38 and the rods 77, will permit the latter to be inclined to the vertical planes of the shafts when the cotton chopper frame is raised. Thus my construction provides for the raising and lowering the chopper frame without disturbing the driving connection between the shafts 38 and the sleeves 63 which rotate the chopper discs 68.

When the chopper frame is swung from side to side about the pin 45, the universal connection between the rods 77 and the shafts 38 will accommodate the side swing of that frame without disturbing the driving connection between those shafts and the sleeves 63. The chopper frame is thus suspended from the main frame for a free swinging movement in substantially all directions without disturbing the driving connection between the ground wheels 1, 1 and the cotton chopping or cutting discs 68, 68.

For the purpose of imparting this universal movement to the chopper frame to insure a uniform operation of the implement in ground of irregular surface and between unequally spaced rows, the following means are preferably employed. Secured to the middle parts of the horizontal portions 49 and 52 of the frame 48, between the sleeves 63, 63 which project through that frame, is a plate 81 that is narrowed at its middle portion. Through the center of this plate a hole is drilled to receive a bolt 82 which connects in a pivotal manner, the horizontal portions of two transverse angle members 83, 83. (See Figures 3 and 7.) Hingedly secured by a bolt 84 to the vertical portion of each angle member 83, is a downwardly curved cultivator bar 85 to the lower end of which is secured a V-shaped plowshare 86. Plow handles 87, 87 extending upwardly and rearwardly at a predetermined angle, are firmly secured to the upper parts of the cultivator bars 85, 85 respectively. (See Figures 1 and 2.)

Hingedly secured by a bolt 88 to the rear top portion of each cultivator bar 85, is an arm 89. These arms 89, 89 incline toward each other for connection at their front ends by a pivot bolt 90 that is longitudinally movable through an elongated slot 91 in a central member 92 that is secured at its front end to the middle portion of the plate 81 by the bolt 82. When the cultivator bars 85, 85 are spread apart, the bolt 90 will be moved rearwardly through the slot 91 in the member 92, and when tightened, it will hold said bars at the desired distance apart. The cultivator bars 85, 85 may also be raised to a desired elevation, either singly or together, about the bolts 84, after which the latter may be tightened to hold them at the desired elevation. The function of the plowshares 86, 86 is to throw the dirt against the plants left standing after the row has been thinned by the chopper discs 68. By means of the handles 87, 87 the chopper frame may be guided or controlled to perform the chopping and cultivating operations efficiently under all conditions. For instance, if the ground is irregular, or the rows are unequally spaced apart, the chopper frame is swung from side to side by these handles, since, as before described, the chopper frame is suspended from the main frame for a universal movement in any direction.

In order that cotton plants may be left standing at desired intervals, the right hand chopper disc 68 in Figure 4 is provided in its perimeter with regularly spaced notches 93. During the travel of the implement over a row, the cotton plants that come within these notches will not be chopped by the discs, but will be left standing, all the remaining ones being cut off by the discs to thin the row.

On the upper side of the left hand disc 68 in Figure 4 there is fastened a circular plate 94 of slightly less diameter than the disc, whose edge is beveled. Against this plate the cutting edge of the right-hand disc 68, which is beveled, revolves when the implement is in operation, for the purpose of cleanly severing the cotton plants that come between the discs save those which enter the notches 93 before described in the right hand disc. To insure the travel of the notched disc 68 against the perimeter of the top plate 94, frogs or toothed portions 95 are turned up from the latter to engage the beveled edge of the notched disc and move it back into its proper path of travel in contact with the plate when it rises above said plate for any reason.

In the accompanying drawings of my invention, the cotton chopping cutter disc 68, 68 revolve at the rate of three revolutions to one revolution of the ground wheels. While any other ratio might be adapted by changes in the construction of the gears, cutter discs and ground wheels, this is the ratio I prefer in the present form of embodiment of my invention.

Having described my invention, I claim:

1. In a cotton chopper, the combination with a wheel-supported main frame, of a chopper frame pivotally secured to the latter, rotatable chopping devices mounted for a swinging movement in the chopper frame, driving means in the main frame, and a universal and sliding connection between the driving means and the chopping devices for the purpose of turning them irrespective of the angular positions of the main frame and the chopper frame relative to each other.

2. In a cotton chopper, the combination with a wheel-supported main frame, of a chopper frame pivotally secured to the latter, rotatable members mounted for a swinging movement in the chopper frame, chopping devices adapted to be rotated by said members, driving means in the main frame, and a universal and sliding connection between the driving means and the rotatable members for the purpose of turning the chopping devices irrespective of the angular positions of the main frame and the chopper frame relative to each other.

3. In a cotton chopper, the combination with a wheel-supported main frame, of a chopper frame pivotally secured to the latter, sleeves mounted for a swinging movement in the chopper frame, chopping devices adapted to be rotated by said sleeves, driving means in the main frame, rods slidingly connected in said sleeves, and a universal connection between said driving means and each rod for the purpose of turning the chopping devices irrespective of the angular positions of the main frame and the chopper frame with respect to each other.

4. In a cotton chopper, the combination with a main frame, an axle supporting the latter, ground wheels on said axle, a shaft transversely mounted in the main frame behind said axle, means for driving said shaft from the axle, of a chopper frame pivotally secured to the main frame for a lateral and a vertical movement relative thereto, a pair of gears on the transverse shaft, a pair of vertical shafts mounted in the main frame, gears on said shafts in mesh with the first named gears, a pair of vertical shafts mounted in the chopper frame, a chopping disc rotatable by each shaft, and a universal and sliding driving connection between the vertical shafts in the main frame and the vertical shafts in the chopper frame for the purpose specified.

5. In a cotton chopper, the combination with a main frame, an axle supporting the latter, ground wheels on said axle, a shaft transversely mounted in the main frame behind said axle, means for driving said shaft from the latter, of a chopper frame pivotally secured to the main frame for a lateral and vertical swinging movement relative thereto, a pair of gears on the transverse shaft, a pair of vertical shafts mounted in the main frame, gears on said shafts in mesh with the first named gears, a pair of sleeves mounted in the chopper frame, chopping discs adapted to be rotated by said sleeves, each sleeve having a longitudinal slot formed therein, a rod slidable in each sleeve and having a projection extending through the slot therein, and a universal connection between the top of each rod and a vertical shaft in the main frame for the purpose specified.

6. In a cotton chopper, the combination with a main frame, of a chopper frame, chopping devices in the latter, means for universally driving said chopping devices from the main frame, and universal and sliding means for suspending the chopper frame from the main frame so that it may be freely swung up and down and from side to side for the purpose specified.

7. In a cotton chopper, the combination with a main frame, of a chopper frame pivotally suspended therefrom, driving means in the main frame, jointed, extensible shafts supported in the chopper frame and connected universally at their upper ends to the driving means, and chopping devices on the lower ends of said shafts.

8. In a cotton chopper, the combination with a main frame, of a chopper frame pivotally suspended therefrom, driving means in the main frame, a pair of jointed, extensible shafts supported at their lower ends in the chopper frame and free to move at their upper ends in a universal manner, chopping discs on the lower ends of said shafts, and universal joints connecting the upper ends of said shafts to the driving means.

9. In a cotton chopper, the combination with a main frame, of a chopper frame pivotally suspended therefrom, driving means in the main frame, a pair of jointed, extensible vertical shafts, chopping devices on the lower ends of said shafts, means for securing the lower ends of said shafts in the lower portion of the chopper frame, the upper portion of said chopper frame having wide openings in which the upper ends of said shafts are free to move in a universal manner, and universal joints connecting the upper ends of said shafts to the driving means.

10. In a cotton chopper, the combination with a main frame, of a chopper frame pivotally suspended therefrom, driving means in the main frame, a pair of jointed, extensible shafts, chopping discs on the lower ends of said shafts, means for securing the lower ends of said shafts in the lower portion of the chopper frame for a movement toward and away from each other, the upper portion of said chopper frame having wide openings in which the upper parts of the shafts are free to move in a universal manner, spring means for resisting the outward movement of the lower ends of said shafts, and universal joints connecting the upper ends of the shafts to the driving means.

11. In a cotton chopper, the combination with a main frame, of a chopper frame secured thereto, driving means in the main frame, guides secured to the chopper frame, a bearing laterally movable in each guide, a shaft journaled in each bearing, a chopping device adapted to be rotated by each shaft, a spring for resisting the outward movement of each bearing, and a universal connection between the driving means and each shaft for the purpose specified.

12. In a cotton chopper, the combination with a main frame, of a chopper frame secured thereto, driving means in the main frame, guides secured to the chopper frame, a bearing laterally movable in each guide, a shaft journaled in each bearing, a chopping device adapted to be rotated by each shaft, an N-shaped spring connected between the outer part of each guide and the bearing therein for resisting the outward movement of the latter, and a universal connection between the driving means and each shaft for the purpose specified.

13. In a cotton chopper, the combination with a main frame, of a chopper frame secured thereto, driving means in the main frame, a pair of bearings in the chopper frame, a shaft journaled in each bearing, a chopping disc adapted to be turned by each shaft, a sleeve having a longitudinal slot connected to each shaft, a rod slidable in each sleeve and having a projection movable through its slot, and a universal connection between each rod and the driving means to rotate the chopping discs.

14. In a cotton chopper, the combination with a main frame, of a chopper frame secured thereto, driving means in the main frame, guides secured to the chopper frame, a bearing laterally movable in each guide, a shaft journaled in each bearing, cutting discs on the shafts, a circular plate secured to the top of one disc of less diameter than the disc, universal means connecting said shafts and the driving means, and springs in said guides for forcing the bearings and their shafts toward each other, whereby the edge of one disc may be held in contact with the plate on the other disc when said discs are rotated by the driving means.

15. In a cotton chopper, the combination with a main frame, of a chopper frame pivotally secured thereto, said chopper frame terminating at its lower end in a horizontal, rectangular portion, driving means in the main frame, a pair of driving shafts projecting downwardly through the horizontal portion of the chopper frame, universal means for connecting the upper ends of said shafts with the driving means in the main frame, chopping devices adapted to be rotated by the lower ends of said shafts, a plate secured to the rectangular portion of the chopper frame between said shafts, and a plow unit secured to said plate for entrance into the ground behind the chopping devices.

16. In a cotton chopper, the combination with a main frame, of a chopper frame pivotally suspended therefrom, driving means in the main frame, rotatable chopping devices mounted in the chopper frame, a universal and sliding connection between the driving means and the chopping devices, and means for swinging the chopper frame to accommodate the chopping devices to ground of irregular surface.

17. In a cotton chopper, the combination with a main frame, of a chopper frame pivotally suspended therefrom, driving means in the main frame, rotatable chopping devices mounted in the chopper frame, a universal and sliding connection between the driving means and the chopping devices, plows secured to the chopper frame behind the chopping devices, and handles for said plows for swinging the chopper frame to accommodate the chopping devices and the plows to ground of irregular surface.

18. In a cotton chopper, the combination with a main frame, of a chopper frame pivotally suspended therefrom, driving means in the main frame, rotatable chopping devices mounted in the chopper frame, a universal and sliding connection between the driving means and the chopping devices, a pair of disc cultivators secured to the chopper frame in front of the chopping devices, plows secured to the chopper frame behind said chopping devices, and means for swinging the chopper frame to accommodate the cultivators, chopping devices and plows to ground of irregular surface.

In testimony whereof I have hereunto set my hand this 5th day of February, 1924.

JOHN TAYLOR DAVIS.

Witness:
HOWARD S. SMITH.